UNITED STATES PATENT OFFICE.

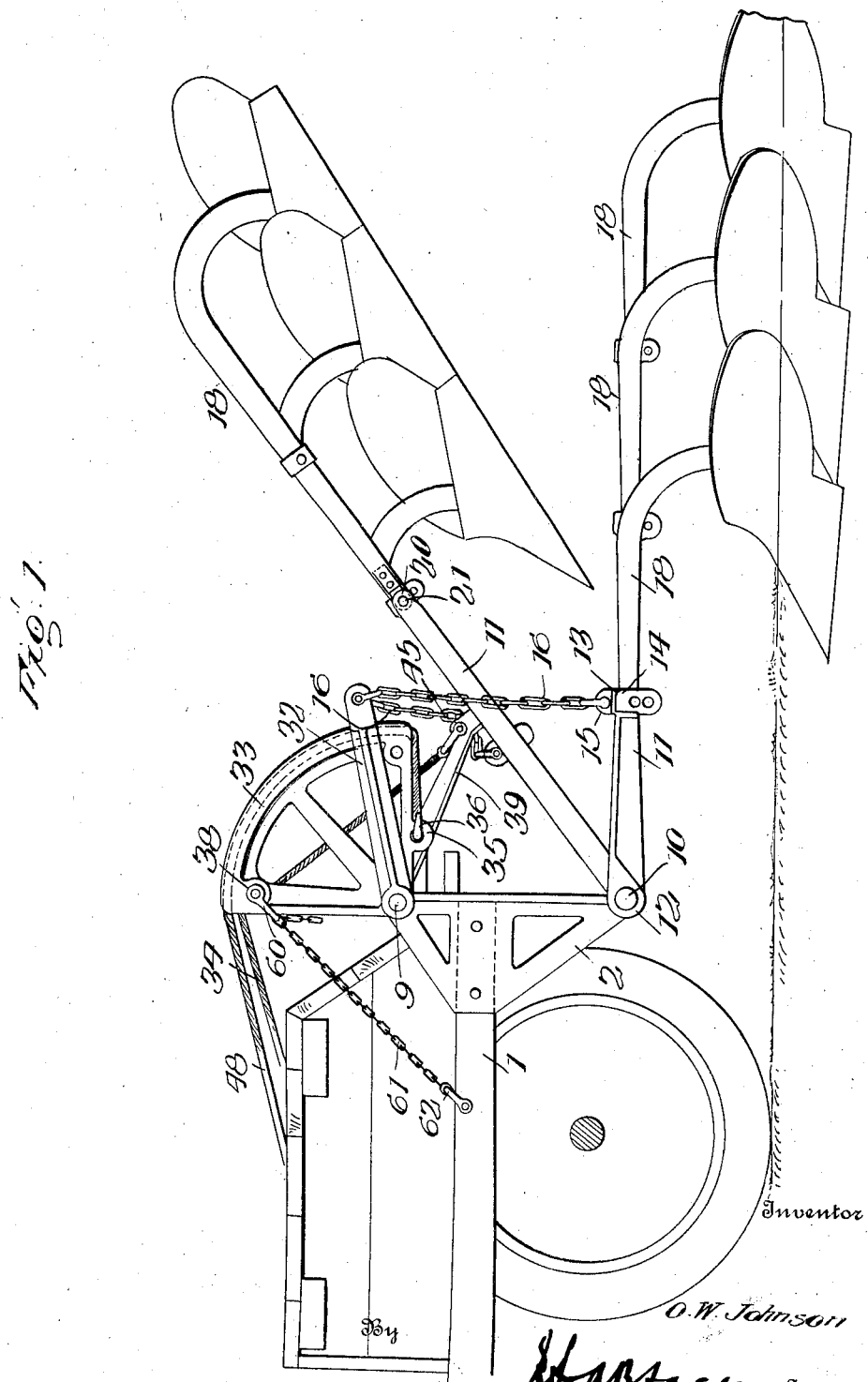

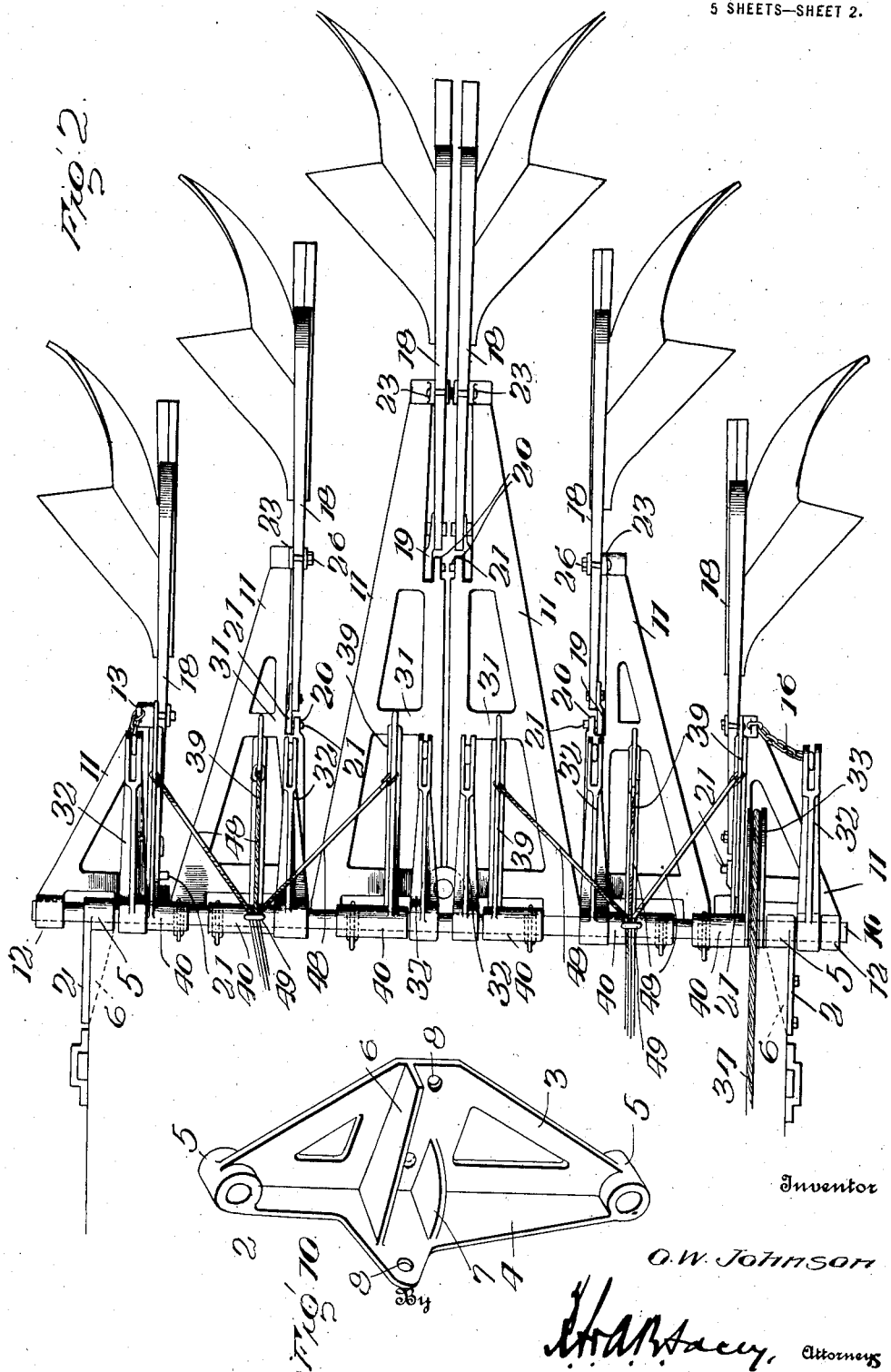

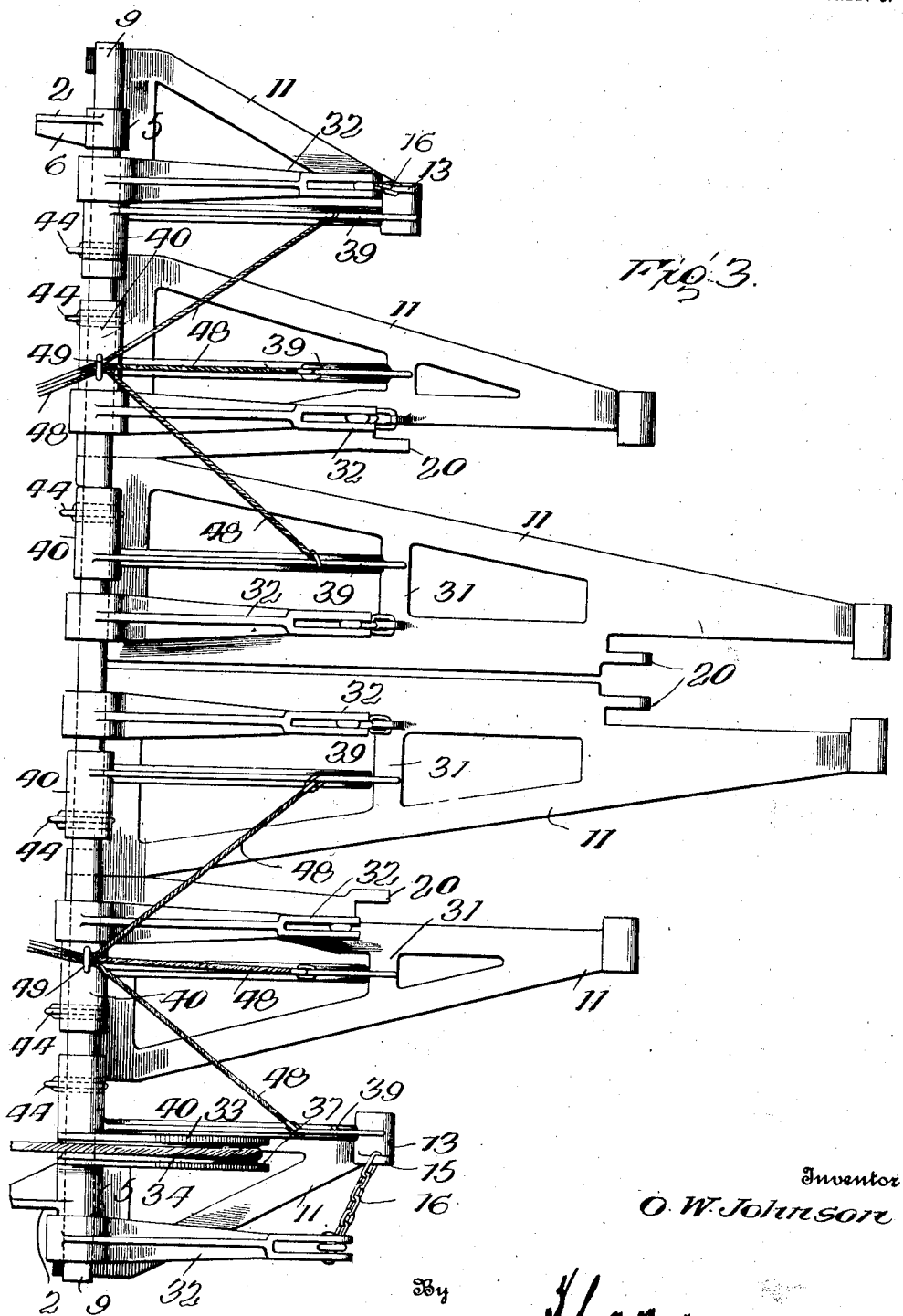

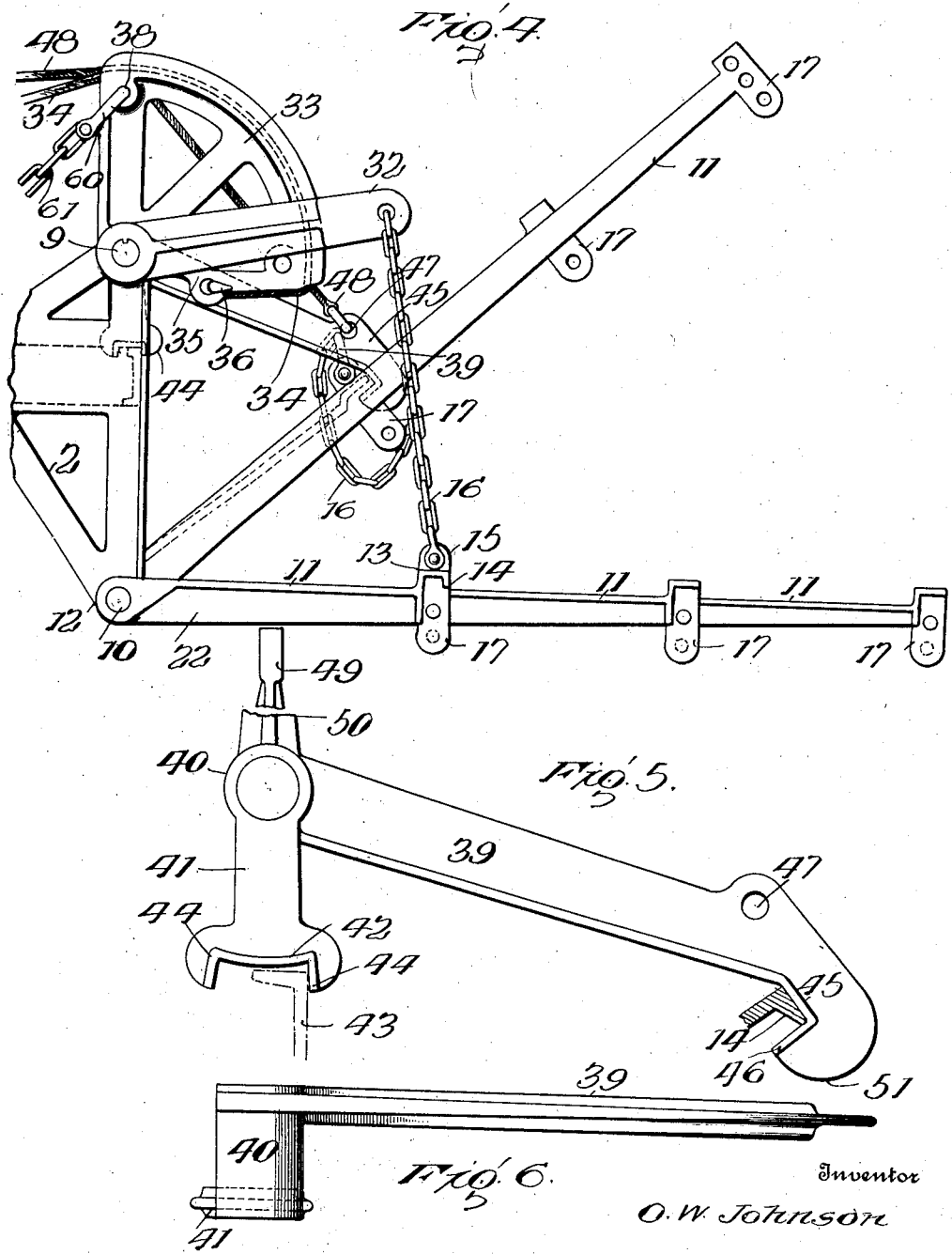

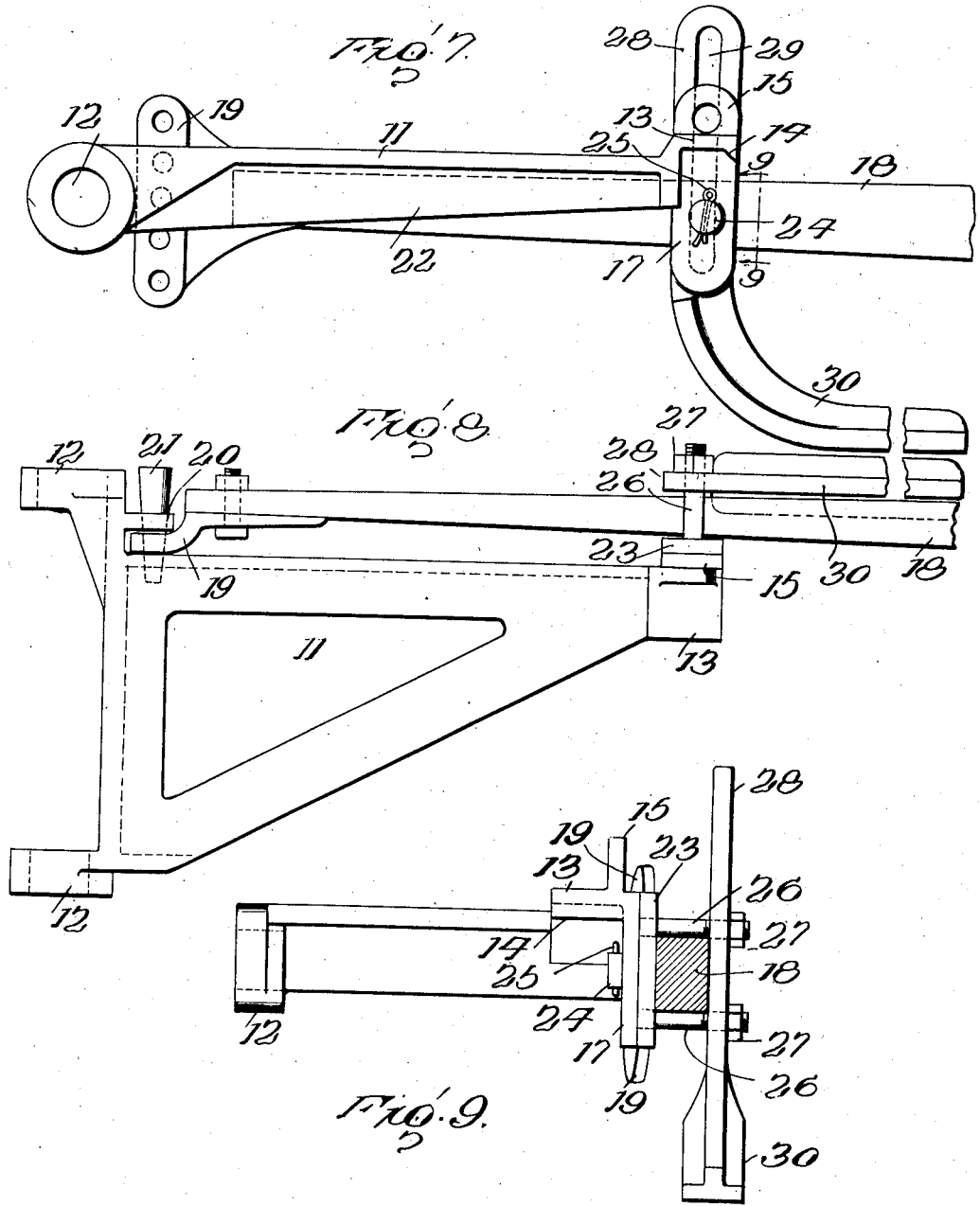

OLIVER W. JOHNSON, OF CLEVELAND, OHIO.

OPERATING MECHANISM FOR GANG-PLOWS.

1,333,207.  Specification of Letters Patent.  Patented Mar. 9, 1920.

Application filed October 12, 1915, Serial No. 55,492. Renewed August 8, 1919. Serial No. 316,204.

*To all whom it may concern:*

Be it known that I, OLIVER W. JOHNSON, a citizen of the United States, residing at Cleveland, in the county of Cuyahoga and State of Ohio, have invented certain new and useful Improvements in Operating Mechanism for Gang-Plows, of which the following is a specification.

This invention relates to gang plows and seeks to provide machinery whereby a gang of plows may be drawn over a field in the same manner as now drawn by draft animals and so arranged that a plurality of furrows will be formed on each trip across a field without the formation of any dead furrows. The invention seeks to provide means whereby a gang of plows may be readily attached to a tractor in such a manner that the draft will be applied to the plows in a low plane so that the plows will be drawn through the ground at a depth which will produce the desired furrow. The invention also seeks to provide means whereby some of the plows may be held in an inoperative position during a trip of the tractor across the field and then readily lowered to operate on the return trip. The invention also seeks to provide novel and efficient means whereby the plows may be easily raised and lowered as occasion may demand, and also provides safety devices whereby a plow will be automatically released from the pull of the tractor upon striking an immovable object and permitted to turn over so as to clear the obstruction without breakage or other damage. The invention also seeks to improve the general construction and arrangement of the parts of the mechanism for operating plows in gangs to the end that the cost of production may be reduced and the efficiency increased.

These stated objects and such other incidental objects as will appear as the description of the invention proceeds are attained in mechanism of the character illustrated in the accompanying drawings and the invention resides in certain novel features which will be particularly pointed out in the claims following the description.

In the annexed drawings:

Figure 1 is a side elevation of a portion of a tractor showing two gangs of plows connected thereto in accordance with my invention;

Fig. 2 is a plan view of the plows;

Fig. 3 is an enlarged plan view of the plow-carrying brackets with the plows removed;

Fig. 4 is an enlarged elevation showing the plow-carrying brackets and the means for raising and lowering the same and holding them in a raised position;

Fig. 5 is a detailed side view, and

Fig. 6 is a detail plan view of the device for holding a plow in an elevated position;

Fig. 7 is a detail elevation of the front end of a plow beam showing the same attached to a plow-carrying bracket and also illustrating a runner or gage;

Fig. 8 is a plan view of the same, and

Fig. 9 is a detail section taken on the line 9—9 of Fig. 7;

Fig. 10 is a detail perspective view of the bracket or standard which is secured to the corner of the tractor frame and provides bearings for the shafts upon which the several working members are mounted.

The tractor 1 is illustrated in a conventional manner only and may be of any suitable construction but will preferably be of a low-down form which is disclosed in a copending application filed by me Aug. 10, 1915, Serial No. 44,805. In carrying out my present invention, I employ a pair of brackets or standards 2 which are made in rights and lefts so as to be secured to the rear corners of the tractor frame at opposite sides of the same. One of these brackets or standards is shown in detail in Fig. 10 from which it will be readily seen that the bracket is a single integral casting having wings 3 and 4 adapted to fit against the side and end, respectively, of the tractor frame. At the upper and lower ends of these wings are sleeves 5 which receive the ends of the pivot rods or shafts hereinafter more fully described, and on the inner face of the side wing 3 is a shelf, rib or flange 6 which is adapted to rest upon the upper side of the tractor frame and thereby aid in bringing the brackets or standards into proper position upon the frame. This member 6 also serves as a brace to reinforce the structure and a similar reinforcing web 7 is provided below the rib or flange 6 and adapted to bear against the under side of the tractor frame, as will be readily understood. The brackets or standards are provided with suitable openings 8 through which bolts may be inserted into the tractor frame to secure the brackets in position and the brackets may be secured to the tractor frame before the other parts are assembled therewith or the entire mechanism may be assembled and the tractor then backed into proper position to cause its rear corners to engage between the ribs 6 and the webs 7, after which fastening bolts are inserted and secured. The sleeves 5 may be complete in one member, as illustrated in the drawings, or may be constructed in similar mating members, accordingly as it may be deemed more desirable to assemble the entire mechanism before connecting it with the tractor or the reverse. Mounted in the upper and lower sleeves 5 and extending across the full width of the tractor are upper and lower shafts 9 and 10. The lower shaft may be fixed rigidly in the brackets or standards and upon the said shaft, I loosely mount the plow-carrying arms or brackets 11. Upon reference to Fig. 2, it will be noted that these plow-carrying arms are graduated in length so that the plows carried by the respective arms to form parallel furrows will be caused to work one behind another and thereby avoid one plow throwing the dirt turned up by it over in advance of an adjacent plow and choking the operation of the same. The brackets may be arranged as shown in Fig. 2 so that the longest plow-carrying arms or brackets will be at the transverse center of the apparatus or they may be arranged in the reverse manner so that the longest arms will be at the sides of the machine. In either arrangement, the plows will preferably be disposed in rights and lefts so that, if one series of plows be worked when the tractor is traveling across the field in one direction and the other series of plows worked when the tractor is traveling in the opposite direction, the entire field will be plowed without any dead furrows being formed and without any idle trips being made. It will be understood, however, that the two gangs may be operated simultaneously. In their essential particulars, the plow-carrying arms or brackets are all alike and a description of one will, to a large extent, suffice for all. It will be noted, upon reference to Figs. 2 and 3 more particularly, that the plow-carrying arms or brackets are triangular in their general form and are mounted upon the shaft 10 at their bases or wider ends. Each arm or bracket is provided with a pair of ears 12 at its base which are spaced apart, as clearly shown, and are adapted to fit upon the shaft 10, as shown in Figs. 1, 2 and 3. By spacing these bearing ears or eyes at some distance apart, a more extended support for the bracket or arm is provided upon the shaft so that the device will be more effectually enabled to resist torsional strain. At the apex or point of convergence of the sides of the shortest bracket, I provide an overhanging shelf-like member 13 which is provided on its under side at its free edge with a lip 14 adapted to engage the locking or holding arm in a manner which will presently appear. Upon the upper side of this shelf-like member 13 is formed a perforated lug or ear 15 to which the hoisting chain or cable 16 is attached. From the shelf-like member 13, at the side of the bracket, depends a tongue 17 which forms a base or supporting plate to which the plow beam, indicated at 18, is pivotally attached. It will be noted, upon reference to Fig. 8, that the plow-carrying arm or bracket is a right triangle and that the base is projected somewhat beyond the side and the tongue 17 is offset somewhat beyond the said side so as to provide a recess to accommodate the clevis 19 which is secured to the front end of the plow beam. A perforated lug 20 is provided upon the base of the bracket in spaced relation to the side thereof and the extremity of the clevis 19 fits into the space between the side of the bracket and the said lug, as clearly shown in Fig. 8. A fragile pin 21 is inserted through the said lug and clevis into an opening provided therefor in the depending web 22 of the bracket so as to sustain the end of the plow beam under normal conditions. The plow beam is pivotally mounted upon the tongue 17 by means of a swinging clamp plate 23 which is provided on one side with a cylindrical boss or stud 24 fitting in an opening provided therefor in the tongue 17 and held against withdrawal by a cotter pin or similar device 25. The plate 23 carries bolts 26 which pass above and below the plow beam and are fitted with nuts 27, whereby they may be clamped to the said plow beam. It will be readily understood that a clamping plate or washer is to be fitted upon the bolts between the nuts and the side of the plow beam and I prefer to obtain the functions of such washer or clamping plate by means of a shank 28 which is placed against the side of the plow beam and is constructed with a longitudinal slot 29 to receive the bolts 26, as shown in Figs. 7, 8 and 9. The lower portion of this shank is turned rearwardly in the illustration and is expanded laterally so as to form a runner 30 adapted to rest upon the ground in advance of the plowshare and thereby regulate the depth to which the share may work into the ground. The particular construction of the runner is not essential and a wheel or other device may be substituted therefor. The clevis 19 will, of course, be provided with a vertical series or plurality of openings whereby the angle at which the plow may run may be adjusted.

The fragile pin 21 is, preferably, a small wooden pin. As long as the plow is working normally, it will be hauled through the earth by the brackets but, when the plow point strikes an immovable obstruction, the forward travel of the share will be arrested whereupon the pull of the tractor will cause the plow to swing about the pivot 24 and carry the clevis downward. The clevis will thereupon shear off the fragile pin 21 and permit the share to rock over the obstruction. The rocking movement may continue until the plow extends forwardly over and rests upon the bracket as the clevis may drop to the ground and act as a fulcrum for further swinging of the plow. After the obstruction has been passed, the operator resets the plow and applies a new pin 21 so that the work may proceed. It will be readily understood that each plow is independent of all the others in this respect, and that an obstruction which does not catch and tend to hold the plow point will not affect it nor the fragile pin as the pivotal mounting of the plow-carrying bracket will permit the plow and the bracket to ride over the obstruction.

By referring to Figs. 2 and 3, it will be noted that the pivotal point of each plow is at the rear extremity or apex of the bracket to which the plow is attached. The lug 20 will, of course, be at the same distance from the rear end of each bracket and will, therefore, be at a distance from the supporting shaft 10 which varies according to the length of the bracket. The longest brackets will be provided with cross bars 31 and the hook-like lips 14 will be formed on the under sides of these cross bars. Fixed upon the upper shaft 9, directly over the respective plow-carrying arms or brackets, are rearwardly projecting lifting or hoisting arms 32 to which the upper ends of lifting chains 16 are attached. A quadrant 33 is also fixed upon the upper shaft 9 and this quadrant has a cable 34 attached thereto and running thereover and thence extending to a point where it may be controlled by the operator. In actual practice, I provided a winding drum to which this cable is attached so that the power of the tractor-driving engine may be utilized to raise the gang of plows. The quadrant is provided on one edge with a perforated lug 35 receiving a hook 36 on the end of the cable 34 and in the arcuate edge of the quadrant is a groove 37 to receive said cable and guide the same. It will, therefore, be readily seen that the cable is carried over the quadrant and will exert its pull at the lower side of the same so that a positive rocking movement will be transmitted to the shaft 9 and the lifting arms 32 caused to move upwardly. At the upper front corner of the said quadrant, I provide an opening 38 to receive a clevis 60 in which is engaged a stop chain 61 which is attached to the tractor frame by a clevis 62. It will be readily understood that, when a pull is exerted upon the cable 34, the shaft 9 will be rocked forwardly and, consequently, the lifting arms 32 will be caused to swing upwardly and, acting upon the chains 16, will lift the plow-carrying brackets and the plows attached thereto. As shown, the stop chain 61 extends downwardly and forwardly from the upper corner of the quadrant to the tractor frame and, when taut, prevents downward and rearward movement of the quadrant and, consequently, of the shaft to which it is secured and the parts carried by said shaft. By engaging different links of the chain in one of the clevises the parts may be permitted to swing downwardly and rearwardly to different degrees which is sometimes desirable.

In order to hold the plows in an elevated and consequently inoperative position, I provide a plurality of locking or holding arms 39 which are formed integral each with a sleeve 40 which is loosely fitted upon the shaft 9. The holding or locking arm is extended radially from one end of the sleeve 40 and will normally extend somewhat downwardly therefrom, as shown in Figs. 4 and 5. At the opposite end of the sleeve 40, I provide a depending stop arm 41 having an arcuate lower end 42 which is adapted to clear the rear beam of the tractor frame, indicated at 43, and is constructed with projections or stops 44 adapted to abut the opposite sides of the said beam, as will be readily understood upon reference to Fig. 5, and thereby limit the movement of the holding arm and, consequently, prevent the arm moving to a position in which it will not properly perform its functions. The free end of the holding arm 39 is turned downwardly as shown at 45, and is then carried inwardly or forwardly, as shown at 46, to provide a hook or beak-like terminal for the arm, which is adapted to engage under the lip 14 on the plow carrying bracket and thereby hold the said bracket and the plow connected therewith in an elevated position. In Fig. 5, I have shown a portion of the plow-carrying bracket in order that this engagement may be clearly understood, and in Fig. 4 some of the brackets are shown in an elevated position and supported in said position by the holding arms. Near the free end of each holding arm is an eye 47 to receive the end of a releasing chain or cable 48 which extends upwardly and forwardly from the holding arm and is carried forwardly over the tractor to any point where it may be conveniently manipulated by the driver. By referring more particularly to Figs. 2 and 3, it will be noted that I have illustrated two gangs of plows, each gang containing three plows. The releasing cable 48 is shown as terminating in three branches, each connected to the holding arm intended to engage one of the plow-carrying brackets. These branches are carried to a guide 49 disposed over the central plow-carrying arm and they are then carried forwardly as a single member. This arrangement permits the same swinging movement to be imparted to all plow-carrying arms in a single gang so that the plows will be raised uniformly, as will be readily understood. The guide 49 may conveniently be a ring or eye provided at the upper end of an arm or standard 50 rising from the sleeve 40 of the central holding arm. The sleeves of the outer holding arms need not be provided with these guide arms and the weight of the machine will, to that extent, be decreased.

The cables 48 will normally be sufficiently taut or under the proper tension to enable the operator to quickly release either series of plows, but, at the same time, permit the holding arms to firmly support the plows which are to be held elevated. It will be readily understood that, when the plows are raised, the members 13 and 31 will be brought against the free under curved edges 51 of the beak-like extremities of the respective holding arms and will ride against said edges and, consequently, swing the said arms upwardly. When the lips 14 clear the edges of the beaks 46, the holding arms will at once drop into the position shown in Fig. 5 so that the said beaks will extend under the ribs 14 and will support the same. The weight of the plows will be thrown upon these beaks and will tend to swing the holding arms downwardly, but this downward movement will be resisted by the contact of the rear stop 44 with the rear cross beam of the tractor and, consequently, the plows cannot drop but will be held in their raised positions. When it is desired to lower the plows, the releasing cables 48 are pulled slightly forward and as they pass through the guide 49 above the holding arms, the said arms will be swung upwardly about the shaft 9 and will withdraw their beaks from under the lips 14 whereupon the plows will at once drop to the ground. Should it be desired to hold only part of a series of plows raised while permitting the other plows of said series to remain on the ground, the holding arm 39 may be manually disengaged from the bracket carrying that plow which is to be lowered. If the holding arms be raised and the cables then secured, the plows may be raised and then again at once lowered by rocking the shaft 9 and this operation may sometimes be found desirable when it is necessary to carry the plows over a gully or a dead furrow, or it is desired to leave a portion of the ground unplowed.

From the foregoing description, taken in connection with the accompanying drawings, it will be seen that I have provided an exceedingly simple mechanism whereby a gang of plows may be drawn over a field by a mechanical motor in exactly the same manner in which they are now drawn by draft animals. I am thus enabled to use the ordinary turning plows which are now in common use and it is not necessary to provide new or special plows when installing a tractor with my improvements upon a farm. The plow-carrying arms or brackets may be coupled to the plow beams in the manner described and then fitted to the shaft 10 and the brackets or standards 2 properly assembled with said shaft. The several holding and lifting arms and the supporting quadrant may be also fitted to the upper shaft and the said shaft mounted in the brackets, after which the tractor may be backed to the assembled mechanism, as will be readily understood, and as hereinbefore mentioned.

By providing means whereby plows may be mounted in two gangs reversely arranged, I am enabled to quickly plow a large field without the formation of any dead furrows or any loss of ground. It will be readily understood that all the plows may be held in a raised position until the farmer reaches the far corner of the field or plot of ground to be plowed. He will then lower the right hand series of plows and drive his machine along the side of the field to the full extent of the field, thereby forming a plurality of furrows, as will be readily understood. The series of plows are then raised and the tractor turned about the rear left hand wheel as a pivot. The series of plows which were previously raised will now be lowered and the machine driven across the field in the reverse direction, thereby forming a second series of furrows which will be turned in the same direction as those previously formed, although they are formed by the left hand plows. In this manner the entire field may be quickly plowed without the formation of any waste spaces. Other methods of advantageously employing gangs of plows will readily suggest themselves to the trained husbandman.

Having thus described the invention, what is claimed as new is:

1. The combination with a frame, of members pivoted thereto in the same transverse plane thereof, means for raising the members, and means for holding the members raised, said holding means being operable to permit one or more of the members to be lowered while holding the remainder raised.

2. The combination with a support, of a plurality of brackets independently pivoted to the support in the same transverse plane thereof and provided on their under sides with transverse lips, the brackets being of unequal length and the said lips being at equal distances from the plane of the pivots of the brackets, means for raising said brackets, and a plurality of freely mounted holding arms above the respective brackets provided with overhanging beaks at their free ends to engage said lips and thereby hold the brackets in raised position.

3. The combination with a support, of a plurality of members independently pivoted on the support in the same transverse plane thereof, means on the frame connected with said several members at equal distances from the pivot thereof for raising the same, and a plurality of gravity holding arms independently mounted on the support in the same transverse plane thereof above the said members to engage the same and hold them individually in raised positions.

4. The combination with a frame, of a rock shaft mounted transversely thereon, a quadrant fixed to said shaft, an operating cable attached to and extending over and forwardly from said quadrant, a plurality of radial lifting arms fixed to said shaft, a plurality of holding arms mounted loosely on the rock shaft in proximity to the respective lifting arms and normally extending downwardly therefrom in locking position, and means connected with the holding arms for limiting the downward movement thereof and raising them to released position.

5. The combination with a frame, of a transverse rock shaft mounted thereon, a transverse pivot rod carried by the frame below the rock shaft, a plurality of devices pivotally coupled to said pivot rod and extending rearwardly therefrom, a plurality of lifting arms secured upon the rock shaft, connections between the several lifting arms and the devices respectively below them extending rearwardly from the pivot rod, a quadrant fixed to said rock shaft, an operating cable attached to said quadrant, and a plurality of holding arms loosely mounted upon the rock shaft in proximity to the respective lifting arms and adapted to hold the said devices individually in raised positions.

6. The combination with a frame, of a plurality of brackets of unequal length pivotally mounted thereon in the same transverse plane thereof and provided with eyes at uniform distances from the pivotal mounting, lifting arms mounted upon the frame above the respective brackets, flexible suspending devices attached to said arms and engaging the eyes on the brackets, gravity holding arms mounted in proximity to the respective lifting arms to engage the respective subjacent brackets, and means for rocking said lifting arms to raise the brackets.

7. In an apparatus for the purpose set forth, the combination of a pivotally mounted bracket having a transverse depending lip, means attached to said bracket to raise the same, a gravitating holding arm pivotally mounted above the bracket and provided with an inwardly projecting beak at its free end adapted to engage under the transverse lip on the bracket, means for limiting the movement of said holding arm, and means attached to said holding arm to raise the same and thereby disengage it from the bracket.

8. In an apparatus for the purpose set forth, the combination of a series of brackets, means for raising said brackets, a series of holding arms freely mounted above the brackets and each adapted to engage the bracket below the same to hold it in a raised position, and a plurality of releasing cables connected to the several holding arms and united at a point in advance of the same.

9. In an apparatus for the purpose set forth, the combination of a plurality of brackets, means for raising said brackets, a plurality of gravitating holding arms disposed above the brackets and adapted to engage the brackets respectively below the same to hold them in raised position, a guide disposed above the central holding arm, and releasing cables secured to the respective arms and converging to and passing through the said guide.

10. In an apparatus for the purpose set forth, the combination of a plurality of brackets, means for raising said brackets, a plurality of gravitating holding arms mounted above the brackets and constructed to engage the same and hold them in raised position, a guide arm projecting upwardly from the pivotal point of the central holding arm, and cables secured to the several arms and converging to and passing through the said guide arm.

11. In an apparatus for the purpose set forth, the combination of a plurality of brackets, means for raising said brackets, a plurality of holding arms constructed to engage said brackets and hold them in raised position, means for releasing said holding arms, and stop arms connected with the respective holding arms and constructed with spaced stops to limit the movement of said arms in either direction.

12. In an apparatus for the purpose set forth, the combination of a plurality of brackets, a plurality of holding arms constructed to engage the respective brackets and hold them in raised positions, said holding arms having laterally disposed pivot sleeves at their forward ends, stop arms depending from said sleeves and provided with spaced stops at their lower extremities, means for raising the brackets, and means for releasing the holding arms from the brackets.

13. The combination with a frame, of brackets secured to the rear corners thereof and projecting above and below the same, the said brackets being provided with bearings at their upper and lower ends and having webs on their inner sides adapted to bear against the upper and lower sides of the frame, a pivot rod mounted in the bearings at the lower ends of said brackets, carrying arms mounted upon said pivot rod, a rock shaft mounted in the bearings at the upper ends of the brackets, means carried by said shaft for raising said carrying arms, and gravitating holding arms mounted loosely on the shaft and adapted to engage the carrying arms.

In testimony whereof I affix my signature.

OLIVER W. JOHNSON. [L. S.]